Patented May 23, 1933

1,910,962

UNITED STATES PATENT OFFICE

ARTHUR L. PITMAN, OF CHARLESTON, WEST VIRGINIA, ASSIGNOR TO WESTVACO CHLORINE PRODUCTS, INC., OF NEW YORK, N. Y., A CORPORATION OF WEST VIRGINIA

STABILIZED TRICHLORETHYLENE

No Drawing.   Application filed April 19, 1932. Serial No. 606,291.

This invention relates to stabilized trichlorethylene; and it comprises trichlorethylene stabilized against the action of air, water, light, acid, etc., by the presence of a modicum of dissolved hexylresorcinol, the amount present being usually about one part per hundred thousand; ten milligrams or so per kilo; all as more fully hereinafter set forth and as claimed.

Trichlorethylene is in extensive use, serving for many purposes, because of its convenient physical properties, its good solvent powers, its chemical inertness and its general stability. Its stability, however, is not absolute. Under some circumstances and under some conditions there is a development of acid in small amount; the extent to which this action goes varying somewhat with different lots of trichlorethylene. The reason for the deterioration is not exactly known. Trichlorethylene, however, contains an ethylenic bond of carbon to carbon and is, at least potentially, susceptible of oxidation for that reason. It is possible that the initial action in deterioration is due to oxidation. Light, air, moisture and acid favor the deteriorative action. And since acid is evolved, the action is to that extent self-accelerating or auto-catalytic to a certain degree.

In some relations any development of acid is annoying, as with material to be packaged in iron or steel drums. It is undesirable in the extraction of caffein from coffee; an operation in which trichlorethylene is largely used. Development of acid is also objectionable in making cleaning emulsions from trichlorethylene. In dry cleaning acid is injurious to the fiber and affects certain dyes.

The use of a little gasoline or heavy oil of one kind or another has been proposed; possibly with the idea of keeping the trichlorethylene freer of dissolved moisture. This admixture is however, in a sense, an adulteration; the mixture is no longer pure trichlorethylene. Moreover, even a small admixture of a petroleum oil changes the boiling point range objectionably. Various dyes have been proposed but, whatever their effectiveness, their use is impracticable except where colored trichlorethylene is wanted; which is seldom the case.

I have found that hexylresorcinol in extraordinarily minute quantity is an effective preservative for trichlorethylene; quantities which are hardly large enough to rank as traces and which as a matter of fact are rather difficult to detect by analysis. The nature of the action exercised is unknown; but it may consist in an inhibition of oxidation; thereby preventing initiaton of changes with development of catalytically acting acid. At all events, good neutral trichlorethylene with addition of less than ten milligrams of hexylresorcinol per kilo is rendered stable for a prolonged time against the action of light, air, moisture, etc.

The action in preserving trichlorethylene appears to be specific to hexylresorcinol, resorcinol itself not appearing to have any similar action save in much larger quantities.

In certain comparative work showing the effect of an addition of hexylresorcinol to trichlorethylene, samples of pure dry commercial trichlorethylene were exposed to diffused light (facing an east window) in white, glass stoppered bottles and the acidity of withdrawn portions tested at frequent intervals, using caustic soda (N/100) solution and phenolphthalein as an indicator. A sample of the trichlorethylene having no addition and having an initial acidity of 0.0002 per cent acid (as HCl) after 9 days standing developed an acidity of 0.005 per cent and after 15 days an acidity of 0.022. In 62 days, the acidity went up to 1 per cent. While these acidities are small in absolute amount, they are measurable and the increase in acidity is substantial. A comparative lot containing 50 milligrams of hexylresorcinol per kilo, under the same conditions, preserved its initial acidity of 0.0005 unchanged for 15 days and after 62 days, test showed only 0.0006 per cent acid.

A comparison of resorcinol and hexylresorcinol was made. With 10 milligrams of added resorcinol per kilo, trichlorethylene showed an initial acidity of 0.001 per cent. In 8 days this went to 0.0036 and in 11 days to 0.025 per cent. To a second portion of the same trichlorethylene was added 10 milligrams per kilo of hexylresorcinol. In 8 days the acidity was 0.0009 and in 11 days 0.0028 per cent. Resorcinol shows much less effect.

In trichlorethylene stabilized under the present invention the amount of hexylresorcinol used is so small as to hardly constitute an impurity; being of the order of one thousandth of a per cent. The properties of hexylresorcinol are, therefore, unimportant; but it may be pointed out that hexylresorcinol is not poisonous, being indeed in commercial use as an internal bactericide because of its non-poisonous properties. In using stabilized trichlorethylene to extract caffein from coffee the amount of hexylresorcinol which could, by any possibility, be left in the coffee is wholly inappreciable.

The quantity of 10 milligrams per kilo indicated is useful with all lots of trichlorethylene of the many I have tested; but, as stated, deterioration in trichlorethylene is an erratic phenomenon and with some lots less hexylresorcinol, down to, say, 3 milligrams per kilo is sufficient.

What I claim is:

1. Trichlorethylene stabilized by the presence of disolved hexylresorcinol.

2. The composition of claim 1 wherein the amount of dissolved hexylresorcinol is about 10 milligrams per kilo.

In testimony whereof, I have hereunto affixed my signature.

ARTHUR L. PITMAN.